Nov. 7, 1950

H. W. WHITING
OPERATING MECHANISM FOR THE INTAKE
VALVES OF EXPANDER ENGINES 2,528,627

Filed Nov. 5, 1945

H. W. WHITING
INVENTOR.

BY Robt Meyer
Attorney

Nov. 7, 1950 — H. W. WHITING — 2,528,627
OPERATING MECHANISM FOR THE INTAKE VALVES OF EXPANDER ENGINES
Filed Nov. 5, 1945 — 6 Sheets-Sheet 4

H. W. WHITING
INVENTOR.

BY Robt Meyer
attorney

Nov. 7, 1950          H. W. WHITING          2,528,627
        OPERATING MECHANISM FOR THE INTAKE
              VALVES OF EXPANDER ENGINES
Filed Nov. 5, 1945                          6 Sheets-Sheet 5

H. W. WHITING
INVENTOR.

BY

Patented Nov. 7, 1950

2,528,627

UNITED STATES PATENT OFFICE 2,528,627

OPERATING MECHANISM FOR THE INTAKE VALVES OF EXPANDER ENGINES

Harold W. Whiting, Buffalo, N. Y., assignor to Worthington Pump and Machinery Corporation, Harrison, N. J., a corporation of Delaware Application November 5, 1945, Serial No. 626,741

12 Claims. (Cl. 121—167)

1

This invention relates to engines, and more particularly to means for controlling the speed of the engine.

An object of the present invention is to provide an engine wherein novel means are incorporated for controlling the operation of the intake valve to control the speed of the engine.

A further object is to provide an engine of the expander type, wherein the speed of the engine is controlled through adjustment of the cutoff position of the intake valve, and in which a novel valve gear is incorporated for actuating the intake valve and adjusting the same to predetermined cutoff positions.

With these and other objects in view, as may appear from the accompanying specification, the invention consists of various features of construction and combination of parts, which will be first described in connection with the accompanying drawings, showing an engine of a preferred form embodying the invention, and the features forming the invention will be specifically pointed out in the claims.

Figure 1:
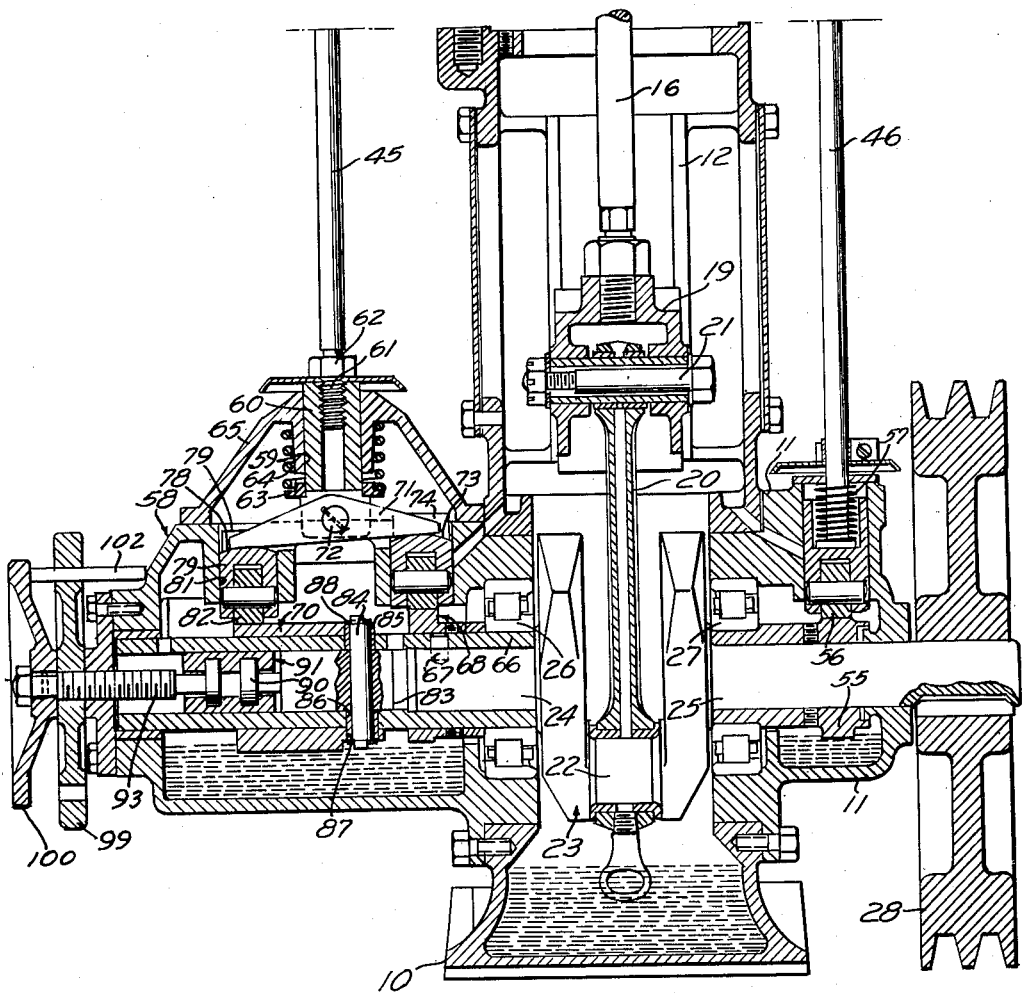
Figure 1 is a sectional view of the crank case and lower part of the engine structure showing the present invention incorporated therein.
Figure 2:
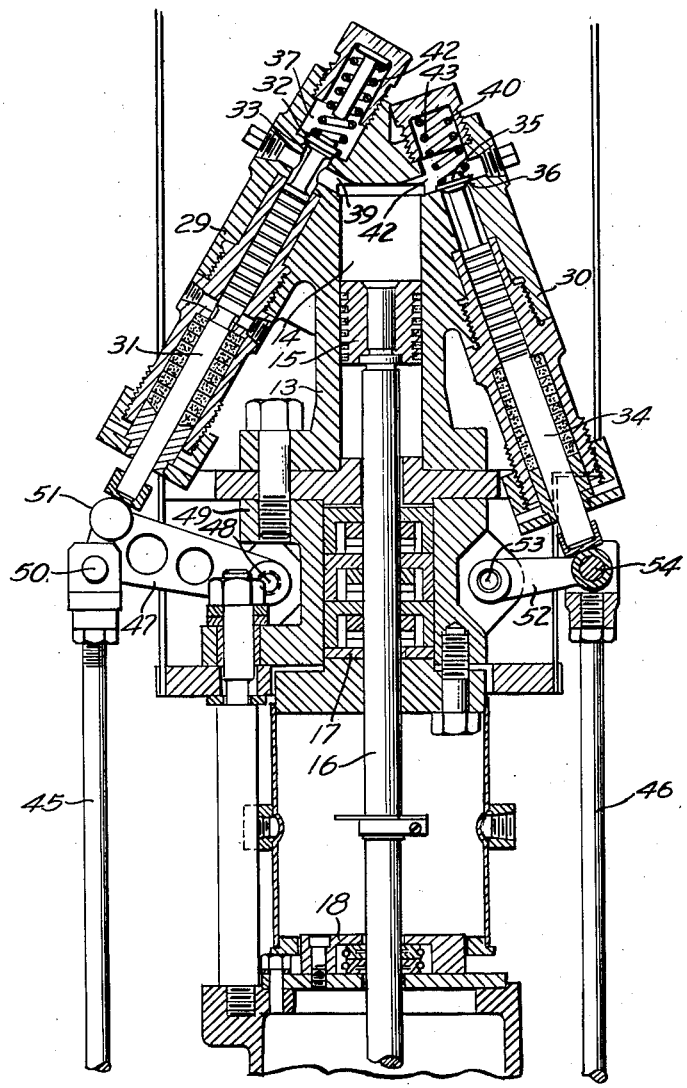
Figure 2 is a similar view of the upper part of the engine structure, the structure shown therein comprising a continuation of the structure shown in Figure 1.

In the embodiment of the invention selected for illustration, Figures 1 and 2 illustrate an expander engine comprising a base 10 which supports a crank case 11. Upon the crank case 11 is mounted a cross-head guide structure 12, the cylinder structure 13 of the engine being mounted upon the structure 12. A cylinder bore 14 is provided in the structure 13, and a piston 15 is slidably contained in the bore 14 and is fixedly connected with a piston rod 16, the latter passing through packing glands 17 and 18 for connection with a crosshead 19. One end of a connecting rod 20 is pivotally connected with the crosshead 19 in any suitable manner, as by a pin 21. The other end of the connecting rod 20 is connected with a crank pin 22 of a crank shaft 23, this crank shaft having shaft elements or trunnions 24 and 25 which are rotatably supported in bearings 26 and 27, respectively. To the shaft element 25 is connected a power take-off sheave or other suitable driving element 28.

Referring to Figure 2, the cylinder body structure 13 supports an intake valve housing 29 and an exhaust valve housing 30. Within the housing 29 is slidably mounted a valve rod 31 to the upper end of which is connected an intake valve 32 which is adapted for seating engagement with a seat 33. Within the housing 30 is slidably mounted an exhaust valve stem 34 which is provided with an exhaust valve 35 at its upper end, this valve being adapted for seating engagement with a seat 36.

Figure 3:
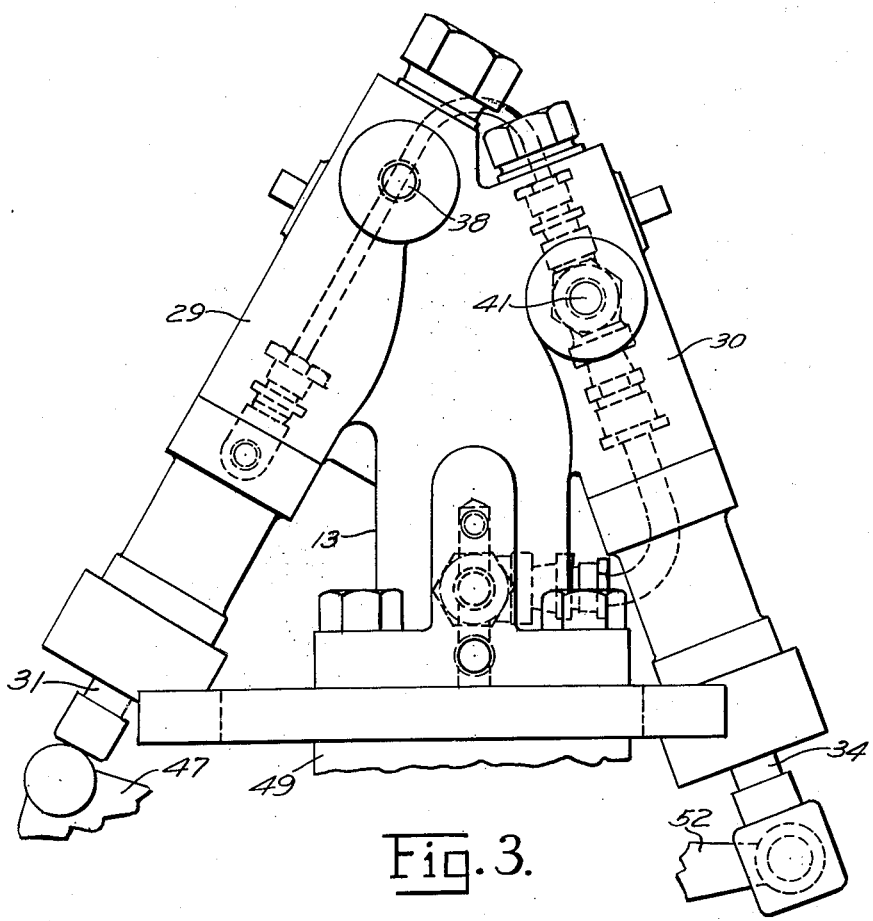
Figure 3 is an elevational view of the structure shown in Figure 2.

A chamber 37 is provided in the valve housing 29, the lower wall of the chamber being defined by the valve seat 33. Figure 3 illustrates an inlet port 38 for admitting the pressure fluid to the chamber 37. In Figure 2, the chamber 37 has communication with the bore 14 through a passage 39, as when the valve 32 is lifted from its seat 33. Similarly, the valve housing 30 is provided with a chamber 40 having one wall thereof defined by the seat 36 and, the chamber is provided with an exhaust port 41, see Figure 3. Communication between the exhaust port 41 and the bore 14 is established through the medium of a passage 42, as when the valve 35 is lifted from its seat 36.

According to Figure 2, the valve 32 is yieldingly held in engagement with its seat 33 by a compression spring 42, and a second compression spring 43 is provided for yieldingly maintaining the valve 35 on its seat 36. A tappet-rod 45 is provided for actuating the stem 31 to lift the valve 32. A similar tappet-rod 46 is provided for actuating the stem 34 to lift its valve 35 off the seat 36. Between the upper end of the tappet-rod 45 and the lower end of the valve stem 31 is interposed a lifting element 47, which element is pivotally connected at 48 with the gland structure 49 and at 50 with the upper end of the tappet-rod 45. This arm is provided with a curved stem engaging contour 51 which engages the lower end of the valve stem 31. In the same manner, a lifting arm 52 is pivotally connected at 53 with the gland structure 49 and at 54 with the upper end of the tappet-rod 46. Both tappet-rods 45 and 46 extend downwardly to the crank case 11, and a cam 55 (see Figure 1) is mounted on the shaft element 25 for coaction with a roller 56 carried by the lower end of the tappet-rod 46 for lifting the latter. A compression spring 57 is housed in the crank case structure 11 for holding the roller 56 in engagement with the cam 55.

A cam housing 58 is attached to one end of the crank case 11, which housing is provided with a bore 59 which slidably guides a connecting element 60 attached to the lower end of the tappet-rod 45. A threaded connection 61 is provided between the tappet-rod 45 and the connecting element 60, which connection is made secure by a lock nut 62. Upon the connecting element 60 is mounted a flange 63 for supporting one end of a compression spring 64. The other end of the spring 64 is arranged in engagement with a cap 65, the latter comprising a portion of the cam housing 58. Thus the tappet-rod 45 is yieldingly biased in a downward direction.

The shaft element 24 is extended some distance beyond the bearing 26 to constitute a mount for a shaft extension 66. This shaft extension is of tubular formation, the shaft element 24 extending inside the extension 66 and fixedly related thereto by a key 67. A lifting cam 68 is mounted upon the extension 66 and keyed thereto at 69. Upon extension 66 is also mounted a seating cam 70. The extension 66 is arranged coaxially with the shaft element 24, and the two cams 68 and 70 are arranged coaxially with the extension 66 and the shaft element 24. While the lifting cam 68 is fixedly related to the extension 66 and the shaft element 24, the seating cam 70 is mounted for longitudinal and rotational movement on and relatively to the shaft extension 66. Operation of the tappet-rod 45 and in turn the intake valve 32 is controlled jointly by the two cams 68 and 70.

The operating connection between the cams 68 and 70 includes a lever or rocking member 71 which is pivotally connected at mid-point, as at 72, with the coupling element 60 at a point beneath the flange 63. One end of the lever 71 is arranged in engagement with a curved face 73 and between fingers 74 on an actuating body 75 which is guided for reciprocatory motion within a bore 76 in the cam housing 58. A roller 77 is carried by the body 75 for engagement with the cam 68.

The opposite end of the lever 71 is arranged in engagement with a curved face 78 on an actuating body 79 between fingers 80 thereon. This body is slidably guided in a bore 81 in the cam housing 58, and the body is provided with a roller 82 which rides on the cam 70.

Figure 4:
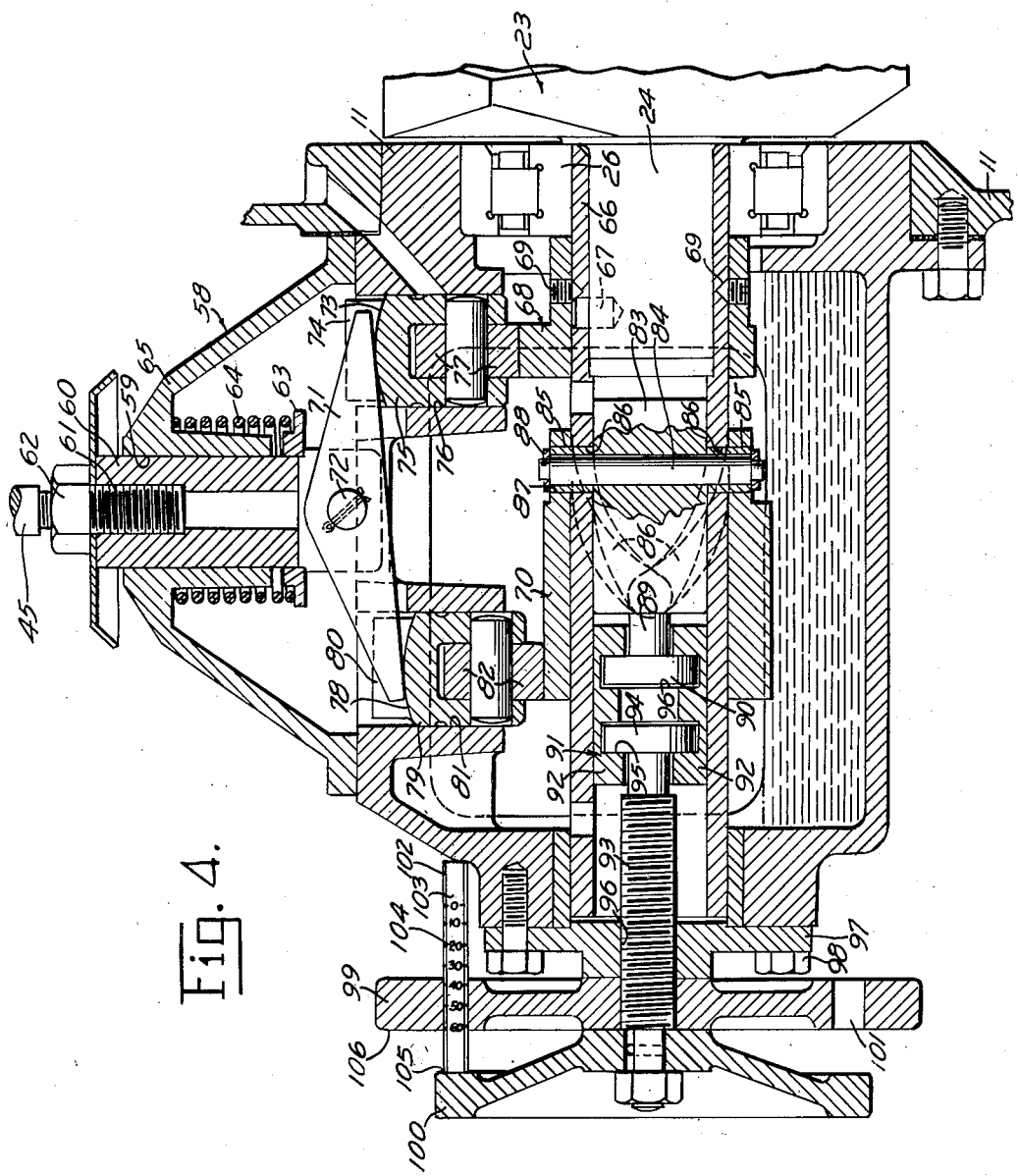
Figure 4 is an enlarged sectional detailed view of a portion of the structure of Figure 1.

Inside the shaft extension 66 is slidably mounted a body 83 through which a cross pin 84 extends. This pin is arranged at right angles to the axis of the shaft extension 66 and is provided with roller bearings 85 at its ends which are slidably contained in slots 86 in the shaft extension 66. Openings 87 are provided in the seating cam 70 for reception of the bearings 85, and the cross pin 84 is restrained from accidental endwise movement by a retainer 88. As will be noted from reference to Figures 4, 8, and 9, the slots 86 are of helical contour and of such extent as to impart 90° of rotation to the seating cam 70 when the latter is moved sufficiently far to shift the cross pin 84 from one extremity of the slots to the opposite extremity thereof. Such rotational adjustment of the seating cam 70 changes the angular position of the latter with respect to the lifting cam 68.

Means for adjusting the body 83 to shift the seating cam 70 comprise a stem 89 on the body 83 and a flange 90 at one end of the stem. A coupling member 91 is slidably contained in the shaft extension 66 and comprises two sections 92 which are internally contoured to loosely receive the stem 89 and the flange 90 so as to provide a swivel connection between the body 83 and the coupling member 91. An adjusting screw 93 is provided with a flange 94 at its inner end corresponding to the flange 90, the flange 94 being loosely contained in a groove 95 in the member 92, which groove corresponds to the groove 96 within which the flange 90 is contained. The screw 93 is loosely related to the coupling member 91 and is threaded through a bore 96 in a cover plate 97 which is bolted at 98 to the cam housing 58. Upon the screw 93 is threadedly mounted a lock wheel 99 which lies adjacent the cover plate 97, and a hand wheel 100 is fixedly connected with the outer end of the screw 93, so that the lock wheel 99 is located between the hand wheel and the cover plate. It will thus be seen that the screw 93 may be rotated through the aid of the hand wheel 100, and that such rotation imparts longitudinal movement to the coupling member 91 relatively to the shaft extension 66, since the screw 93 has a swivel connection with the coupling member 91, as is also true of the body 83.

Means are provided for indicating the degree of retraction of the cam 70 through adjustment of the screw 93. Openings 101 are provided in the lock wheel 99 for selective reception of an indicator rod 102. This rod is provided with a flattened face 103 upon which is provided a suitable scale 104. This rod is arranged in parallelism with the screw 93 and has one end arranged to abut the face 105 of the hand wheel 100 to the end that the scale 104 in its relation to the face 106 of the lock wheel 99 will indicate the retracted position of the cam 70 when the rod 102 is moved into end engagement with the hand wheel 100.

Figure 5:
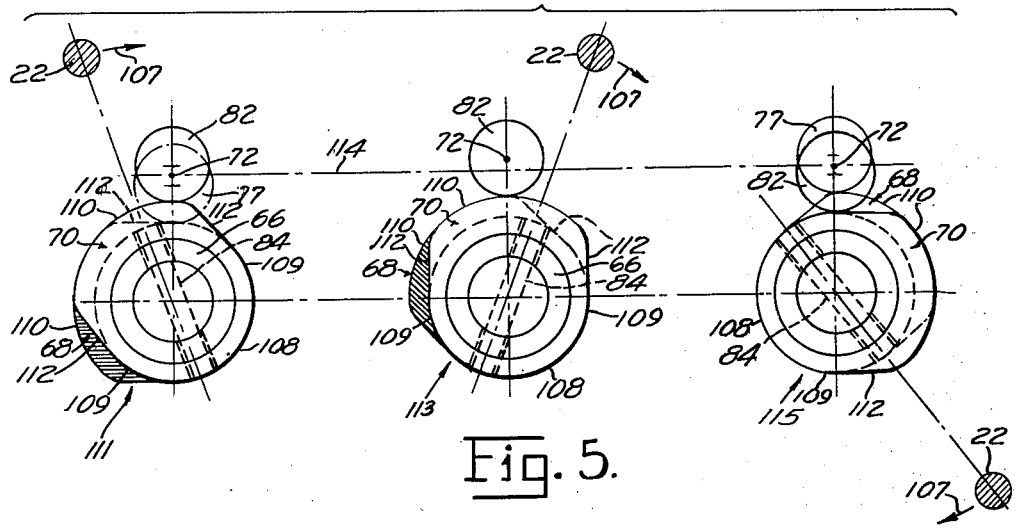
Figure 5 is a diagrammatic view showing the action of cam means employed for controlling the operation of the intake valve of the engine.
Figure 6:
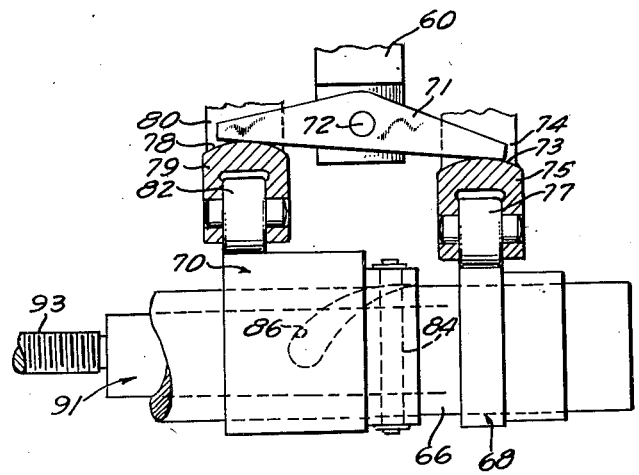
Figure 6 is a side view of the cam means assembly.
Figure 7:
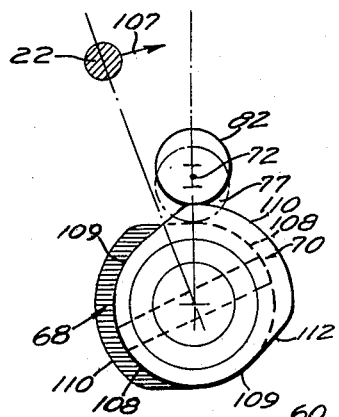
Figure 7 is a diagrammatic view of the cam means assembly illustrating another operating adjustment thereof.

Figures 5 and 7 illustrate the lifting cam 68 and the seating cam 70 when viewed from the hand wheel end of the assembly, and clockwise rotation of the crank shaft is assumed, as indicated by an arrow 107 in association with the crank pin 22. While the cams 68 and 70 are of identical construction when viewed according to Figures 5 and 7, the seating cam 70 is of considerable axial length to maintain operative engagement with the roller 82 in all positions of the seating cam.

Figure 8:
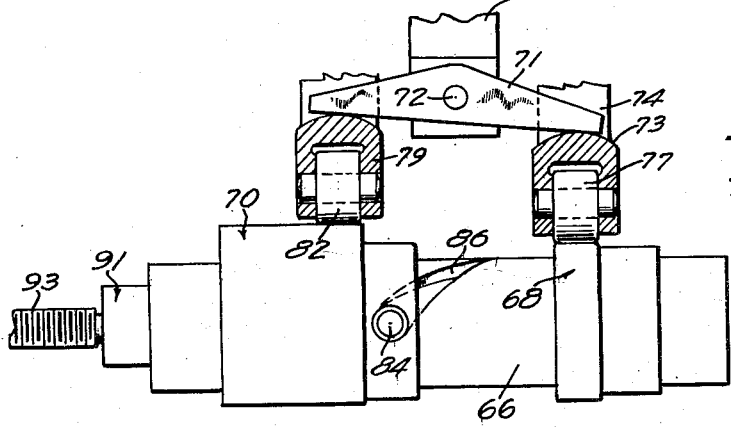
Figure 8 is a side elevational view of the cam means assembly when adjusted according to Figure 7.
Figure 9:
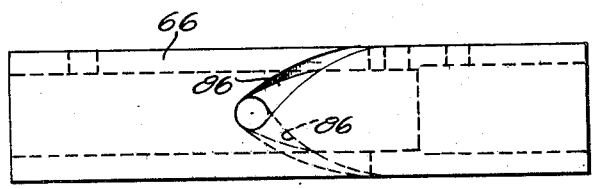
Figure 9 is an elevational view of a shaft extension comprising an element of the cam means assembly structure shown in Figures 5 through 8.

Figures 7 and 8 show the relative relationship between the cams 68 and 70 in the fully retracted position of the screw 93. With the cams in the position shown, no lift is imparted to the intake valve 32. Each cam includes a low radius extent 108, ramps 109 at the ends of the low radius extent 108, which ramps continue into a high radius or dwell 110. In the cam adjustment of Figure 7, the lifting cam roller 77 rises in increments equal to the fall of the seating cam roller 82 which results in a zero lift to the pivot 72 located intermediate the ends of the lever 71. Thus no lift is imparted to the intake valve 32 in the cam arrangement of Figure 7.

Figure 5 illustrates the relative positions of the cams 68 and 70 upon adjustment of the screw 93 to place the cross pin 84 at the opposite ends of the slots 86. In viewing Figures 5 and 7, it will be noted that retraction of the screw 93 imparts clockwise rotation to the seating cam 70 relatively to the lifting cam 68. Similarly, when the screw 93 is advanced inwardly for shifting the cross pin 84 in the slots 86, counter-clockwise rotation is imparted to the seating cam 70 relatively to the lifting cam 68. While Figures 5 and 7 illustrate the cams 68 and 70 in their two extreme relative positions, it will be understood that the cams may be adjusted to any desired relative positions to attain necessary intake valve operation and control of the engine.

With the cams 68 and 70 in the position 111 of Figure 5, clockwise rotation of the crank shaft imparts a lift to the pivot 72, since the cam roller 82 is already on the high radius or dwell 110 on the cam 70, and the cam roller 77 is riding the straight face 112 on the cam 68. Accordingly, continued clockwise rotation of the cam assembly brings the cam roller 77 upon the high radius or dwell extent 110 on the cam 68 to impart full lift to the pivot 72 and a corresponding lift to the intake valve 32.

In Figure 5, position 111 of the cams 68 and 70 indicates the start of the lifting action, with position 113 of the two cams illustrating the lift in its maximum degree, which lift is represented by the relative positions of the pivot 72 with respect to the line 114. As the cams 68 and 70 continue rotation in a clockwise direction, the cam rollers 77 and 82 are brought to the relative relationship indicated in position 115, which completes the lifting operation and brings the intake valve 32 back to its closed position, the pivot 72 now being brought back to the location corresponding to that of position 111. The leading and following active faces on the cams 68 and 70 are such that either cam roller will ascend or descend in increments equal to the descending and ascending characteristics of the other cam roller.

Since the lifting cam 68 is fixedly related to the crank shaft of the engine for co-axial rotation therewith, the start of the lifting action of the intake valve 32 is invariable, the cutoff operation of the intake valve being determined through adjustment of the seating cam 70 relatively to the lifting cam 68. In the construction shown, the cutoff may be selected at any desired point within the limits of the slots 86, which slots are of such lengths as to provide necessary accommodation for adjustment of the seating cam. This arrangement provides a construction wherein the speed of the engine may be effectively controlled through the act of shutting off the working fluid at any desired point within the operating cycle of the engine, the construction being devoid of objectionable stages or steps of cutoff. In other words, the cutoff points are infinite within the limits of the zero and maximum lifting positions of cam adjustment.

It will be understood that the invention is not to be limited to the specific construction or arrangement of parts shown, but that they may be widely modified within the invention defined by the claims.

What is claimed is:

1. In an engine of the type described: the combination of a cylinder provided with an intake valve; a crank shaft having a tubular extension; a lifting cam fixed to said tubular extension; a seating cam adjustably mounted on said tubular extension; an operating connection between said lifting cam and said seating cam and the intake valve; said tubular extension being provided with helical slots, a cross pin connected with said seating cam and guided freely in said slots; an adjusting screw having a swivel connection with said cross pin for shifting the latter in said slots to adjust the seating cam relatively to the lifting cam and vary the cutoff action of the intake valve; a hand wheel for turning said adjusting screw; a lock means threadedly connected with said adjusting screw; and an indicator coactive with said hand wheel and said lock means to indicate adjusted positions of the adjusting screw and corresponding positions of said seating cam.

2. In an engine of the type described: the combination of a cylinder provided with an intake valve; a crank shaft having a tubular extension; a lifting cam fixed to said tubular extension; a seating cam adjustably mounted on said tubular extension; an operating connection between said lifting cam and said seating cam and the intake valve; said tubular extension being provided with helical slots, a cross pin connected with said seating cam and guided freely in said slots; an adjusting screw having a swivel connection with said cross pin for shifting the latter in said slots to adjust the seating cam relatively to the lifting cam and vary the cutoff action of the intake valve; a hand wheel for turning said adjusting screw; a lock means threadedly connected with said adjusting screw; and an indicator coactive with said hand wheel and said lock means to indicate adjusted positions of the adjusting screw and corresponding positions of said seating cam; said operating connection including a tappet, a pivoted lever on said tappet, and slidably guided cam rollers interposed between said lever and the respective lifting cam and the seating cam.

3. The invention claimed in claim 2 wherein said cross pin is provided with bearings engaging the wall faces of said helical slots.

4. In an expander engine having a crank case, a crank shaft, a cylinder and an intake valve for said cylinder, means for opening and closing said intake valve including an axially movable tappet, means operatively connecting said tappet to said intake valve, a lever pivotally connected intermediate its ends to the end of said tappet remote from said intake valve, actuating bodies slidably carried by said crank case and engaging the end portions of said lever, cam rollers carried by said slidable actuating bodies, and cams for operating said actuating bodies by moving said lever and tappet to operate said intake valve.

5. In an expander engine having a crank case, a crank shaft, a cylinder and an intake valve for said cylinder, means for opening and closing said intake valve including an axially movable tappet, means operatively connecting said tappet to said intake valve, a lever pivotally connected intermediate its ends to the end of said tappet remote from said intake valve, actuating bodies slidably carried by said crank case and engaging the end portions of said lever, cam rollers carried by said slidable actuating bodies, a lifting cam fixed to said crank shaft, a seating cam rotatable with and axially and rotatably movable relative to said crank shaft and said lifting cam, and means for shifting said seating cam relative to said crank shaft for varying the time closing of said inlet valve.

6. In an expander engine having a crank case, a crank shaft, a cylinder and an intake valve for said cylinder, means for opening and closing said intake valve including an axially movable tappet, means operatively connecting said tappet to said intake valve, a lever pivotally connected intermediate its ends to the end of said tappet remote from said intake valve, actuating bodies slidably carried by said crank case and engaging the end portions of said lever, cam rollers carried by said slidable actuating bodies, a tubular extension on said crank shaft, a lifting cam fixed to said tubular extension, a seating cam rotatable with and shiftable axially and rotatably relative to the tubular extension, and means for shifting said seating cam relative to said tubular extension for varying the time closing of said inlet valve.

7. In an expander engine having a crank case, a crank shaft, a cylinder and an intake valve for said cylinder, means for opening and closing said intake valve including an axially movable tappet, means operatively connecting said tappet to said intake valve, a lever pivotally connected intermediate its ends to the end of said tappet remote from said intake valve, actuating bodies slidably carried by said crank case and engaging the end portions of said lever, cam rollers carried by said slidable actuating bodies, a tubular extension on said crank shaft, a lifting cam fixed to said tubular extension, a seating cam rotatable with and shiftable axially and rotatably relative to the tubular extension, said tubular extension provided with helical slots therein, a pin fixed to said seating cam and engaging in said helical slots, and means connected to said pin for shifting the pin to move said seating cam axially and rotatably relative to the tubular extension for varying the time closing of said inlet valve.

8. An expander engine as claimed in claim 7 wherein said pin-shifting means comprises an adjusting screw and a flexible connection between said adjusting screw and said pin.

9. An expander engine as claimed in claim 7 wherein said pin-shifting means comprises an adjusting screw, a flexible connection between said adjusting screw and said pin, and locking means for locking said adjusting screw in adjusted positions.

10. An expander engine as claimed in claim 4 wherein said slidable actuating bodies have arcuate surfaces for contact with said lever, and spring means for urging said lever into engagement with said arcuate surfaces.

11. An expander engine as claimed in claim 5 wherein said slidable actuating bodies have arcuate surfaces for contact with said lever, and spring means for urging said lever into engagement with said arcuate surfaces and said cam rollers into engagement with said cams.

12. An expander engine as claimed in claim 7 wherein said slidable actuating bodies have arcuate surfaces for contact with said lever, and spring means for urging said lever into engagement with said arcuate surfaces.

HAROLD W. WHITING.

REFERENCES CITED

The following references are of record in the file of this patent:

UNITED STATES PATENTS

| Number | Name | Date |
|---|---|---|
| 1,145,800 | Rushton | July 6, 1915 |
| 1,239,826 | Rosenzweig | Sept. 11, 1917 |
| 1,737,581 | French et al. | Dec. 3, 1929 |
| 2,009,745 | Riesner | July 30, 1935 |
| 2,107,456 | Trapp | Feb. 8, 1938 |

FOREIGN PATENTS

| Number | Country | Date |
|---|---|---|
| 119,741 | Germany | Apr. 24, 1901 |